United States Patent
Schneider

(10) Patent No.: US 8,615,084 B2
(45) Date of Patent: *Dec. 24, 2013

(54) EXTENDING A SECRET BIT STRING TO SAFEGUARD THE SECRET

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 792 days.

This patent is subject to a terminal disclaimer.

(21) Appl. No.: 12/129,426

(22) Filed: May 29, 2008

(65) Prior Publication Data

US 2009/0323958 A1  Dec. 31, 2009

(51) Int. Cl.
H04L 9/00 (2006.01)

(52) U.S. Cl.
USPC .......................................................... 380/277

(58) Field of Classification Search
USPC ................. 380/28, 30, 46, 277; 713/76, 150, 713/168
See application file for complete search history.

(56) References Cited

U.S. PATENT DOCUMENTS

| | | | | |
|---|---|---|---|---|
| 4,037,093 | A * | 7/1977 | Gregg et al. | 708/492 |
| 4,200,770 | A | 4/1980 | Hellman et al. | |
| 6,035,041 | A | 3/2000 | Frankel et al. | |
| 6,122,742 | A | 9/2000 | Young et al. | |
| 7,167,565 | B2 * | 1/2007 | Rajasekaran | 380/282 |
| 7,200,752 | B2 | 4/2007 | Eskicioglu | |
| 7,707,426 | B2 | 4/2010 | Lauter et al. | |
| 2003/0044004 | A1 | 3/2003 | Blakley et al. | |
| 2007/0248224 | A1 * | 10/2007 | Buskey et al. | 380/30 |
| 2008/0260143 | A1 | 10/2008 | Ibrahim | |
| 2009/0060175 | A1 | 3/2009 | Schneider | |
| 2009/0060179 | A1 * | 3/2009 | Schneider | 380/46 |
| 2010/0008496 | A1 * | 1/2010 | Gentry | 380/28 |
| 2010/0217978 | A1 | 8/2010 | Schneider | |

OTHER PUBLICATIONS

Wang et al., Secret image sharing with smaller shadow images, Pattern Recognition Letters 27, 2006, pp. 551-555.*
Schneier, Bruce, "Applied Cryptography, Second Edition—Protocols, Algorithms and Source Code in C", © 1996, John Wiley & Sons, Inc., title pages, pp. viii and 47-74.
Asmuth, Charles, et al., "A Modular Approach to Key Safeguarding", IEEE Transactions on Information Theory, vol. IT-29, No. 2, Mar. 1983, (pp. 208-210).
Blakley, G. R., "Safeguarding Cryptographic Keys", National Computer Conference, 1979, AFIPS—Conference Proceedings, vol. 48, AFIPS Press, Montvale, NJ 07645, (pp. 313-317).
Blakley, G. R., et al., "Security of Ramp Schemes", Lecture Notes in Computer Science—Advances in Cryptology, Proceedings of CRYPTO 84, Springer-Verlag, (pp. 242-268).
Schneider, James P., "Embedding a Secret in a Bit String for Safeguarding the Secret", U.S. Appl. No. 11/897,489, filed Aug. 29, 2007, (Whole Document).

(Continued)

*Primary Examiner* — Teshome Hailu
(74) *Attorney, Agent, or Firm* — Lowenstein Sandler LLP

(57) ABSTRACT

A method and system extends a secret bit string to safeguard the secret. In one embodiment, the method comprises adding a secret bit string of length s to a product of two random bit strings using arithmetic defined for polynomials over GF(2) to produce an extended bit string. The extended bit string has a length m that is longer than s. A total of n shares are generated from the extended bit string, of which at least k shares are needed to reconstruct the secret bit string. The n shares are distributed to a plurality of cooperating computing entities for secret sharing.

22 Claims, 6 Drawing Sheets

(56) References Cited

OTHER PUBLICATIONS

Schneider, James P., "Method for Sharing Secret Information Among Cooperating Parties", U.S. Appl. No. 11/897,491, filed Aug. 29, 2007, (Whole Document).

Shamir, Adi, "How to Share a Secret", Programming Techniques, Communications of the ACM, Nov. 1979, vol. 22, No. 11, (pp. 612-613).

Lin et al., "Secret image sharing with steganography and authentication", ElSevier, 2004, pp. 405-414.

Notice of Allowance for U.S. Appl. No. 11/897,489 mailed Feb. 9, 2011.

Office Action for U.S. Appl. No. 11/897,491 mailed Aug. 12, 2011.

Office Action for U.S. Appl. No. 11/897,491 mailed Mar. 30, 2011.

Office Action for U.S. Appl. No. 11/897,489 mailed Mar. 24, 2011.

Office Action for U.S. Appl. No. 11/897,489 mailed Oct. 5, 2010.

Desmedt et al, "Threshold Cryptosystems", Advances in Cryptology—CRYPTO 89, 1990, Springer-Verlag, pp. 307-315.

Ingemarsson et al, "A Protocol to Set Up Shared Secret Schemes Without the Assistance of a Mutually Trusted Party", Advances in Cryptology—EUROCRYPT 90, 1991, Springer-Verlag, pp. 266-282.

\* cited by examiner

SECRET SHARING

EXTENDING A SECRET BIT STRING

EXTRACTING THE SECRET FROM
THE EXTENDED BIT STRING

EXTENDING A SECRET BIT STRING TO SAFEGUARD THE SECRET

CROSS-REFERENCE TO RELATED APPLICATIONS

The present invention is related to co-pending patent application Ser. No. 11/897,491 and patent application Ser. No. 11/897,489, both of which were filed on Aug. 29, 2007.

TECHNICAL FIELD

Embodiments of the present invention relate to cryptographic techniques, and more specifically, to embedding a secret in a bit string for safeguarding the secret.

BACKGROUND

Secret sharing (or threshold secret sharing) is a cryptographic scheme that divides a secret into n pieces (or shares) such that any k of them (k<n) can be used to reconstruct the secret.

Adi Shamir discloses a technique that uses polynomial interpolations in the finite field GF(p) to construct a threshold secret sharing scheme (A. Shamir, "How to Share a Secret," Communications of the ACM, v. 24, n. 11, November 1979, pp. 612-613). George Blakley discloses a technique that uses hyperplane intersections in space to reconstruct a secret (G. R. Blakley, "Safeguarding Cryptographic Keys," Proceedings of the National Computer Conference, 1979, American Federation of Information Processing societies, c. 48, 1979, pp. 313-317). However, in the polynomial interpolation scheme, inadvertently using an extra share produces an incorrect result. In the hyperplane intersection scheme, the number of required shares is obvious, and there is no way to use too many. Thus, it is generally not possible to distribute shares without also informing the recipients how many shares are required to reconstruct the secret.

Other secret sharing techniques based on the Chinese remainder theorem, such as the Asmuth-Bloom algorithm (C. Asmuth and J. Bloom, "A Modular Approach to Key Safeguarding," IEEE Transactions on Information Theory, v. IT-29, n. 2, March 1983, pp. 208-210), have also been proposed. However, these algorithms are defined only in the integer ring and cannot be easily extended to other rings or principal ideals. Integer arithmetic is not as suited for computers as other forms of arithmetic, for example, binary arithmetic. Thus, there is a need to develop a secret sharing technique that overcomes the above inherent limitations of the known techniques.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
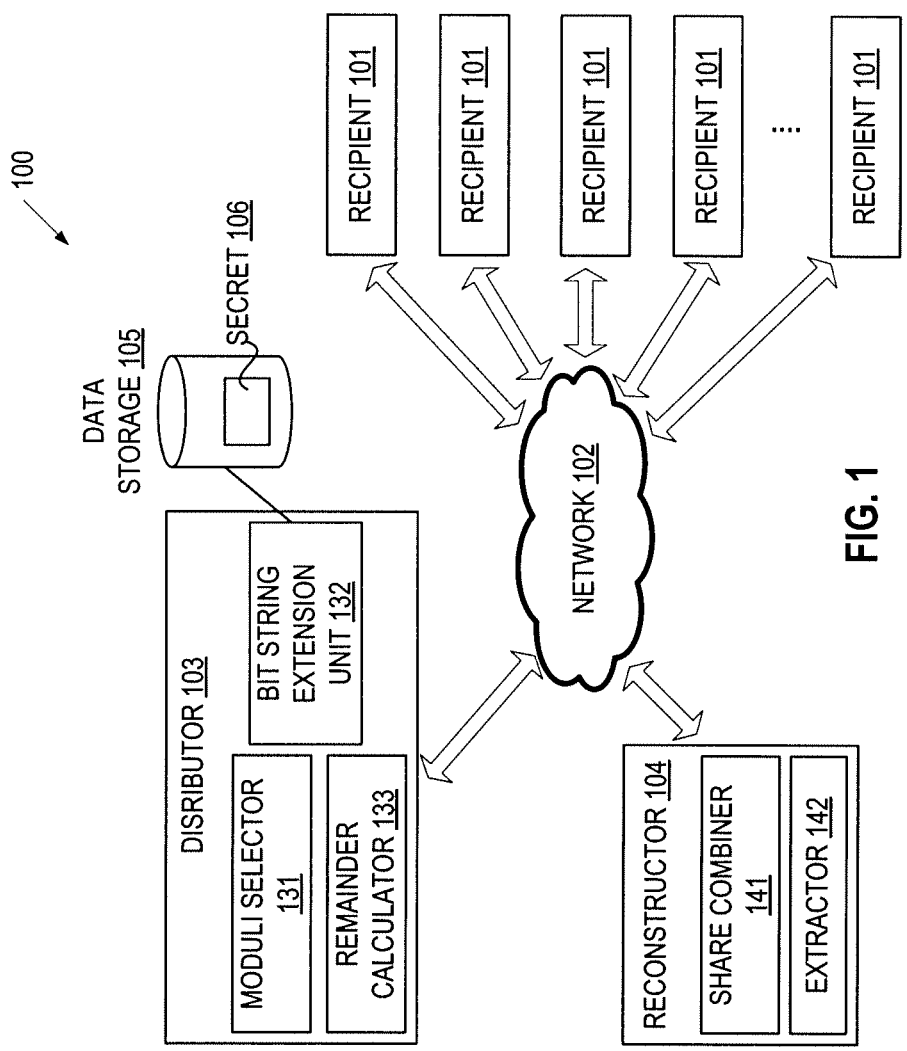
FIG. 1 illustrates a network architecture in which embodiments of the present invention may be implemented.

A method and system for extending a secret bit string are described. In one embodiment, the length of the secret bit string is extended to generate an extended bit string, which can be shared by a plurality of cooperating computing entities. The extended bit string may be calculated by adding a secret bit string to the product of two random bit strings. The calculation is performed using arithmetics defined for polynomials over $GF(2)$. Each of the two random bit strings has a length longer than the length of the secret bit string. Using the extended bit string, a plurality of shares are generated. The shares are distributed to the cooperating computing entities to safeguard the secret.

In one embodiment, each share of the secret includes a pair of modulus and remainder that are generated based on the Chinese remainder theorem. The shares are calculated from an extended bit string, which is the secret bit string extended in length. The secret bit string is extended in length such that each share is generated from moduli that have a "safe" length (e.g., at least as long as the original secret). Longer moduli increase the difficulty of brute force attacks. As described herein, the secret bit string is extended without the calculation of large integer mathematics. Rather, the extension calculation uses arithmetic with polynomials over $GF(2)$, which is faster in hardware and in software as well. The extension calculation is conceptually simple and easy to implement.

The secret sharing technique described herein allows the use of more than a threshold number of shares to reconstruct a secret. Thus, the shares can be distributed without informing the recipients how many shares are needed to reconstruct the secret. If more than enough shares (i.e., greater than the threshold number of shares) are used in reconstructing the secret, the result will still be the same.

An exemplary use of the secret sharing technique is a multi-factor key escrow system, where shares from a master key are given to a set of federated entities such that a threshold number of these shares can be used to reconstruct the master key. For example, an employee of a company in a high-security position (e.g., a corporate controller, or a human resources specialist) may have a master password that protects a secret key they need to use to authenticate on their corporate workstation. Ordinarily, this master key is only used by this employee. However, if something were to happen to this employee, his/her replacement would need to be able to gain access to this master key. As the master key provides its owner access to sensitive data, the company cannot just give a backup copy of the master key to someone for safe keeping (e.g., it would be disastrous if a disgruntled employee was able to cut himself a million dollar severance check). Thus, the master key can be split up into multiple shares, so that a share is held by each of several trusted employees. A minimum number of these trusted employees would need to present their shares and reconstruct the secret (i.e., the master key). Illustratively, one share may go to the employee's boss, and other shares may be distributed to other department heads or managers.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "adding", "distributing", "generating", "dividing", "obtaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary cryptosystem 100 in which embodiments of the present invention may operate. The cryptosystem 100 includes a plurality of recipients 101 and a distributor 103 coupled by a network 102, which may be a public network (e.g., Internet) or a private network (e.g., Ethernet or a Local Area Network (LAN)). In one embodiment, each of the distributor 103 and recipients 101 is a computing system that manages secret information. The distributor 103 is locally coupled to data storage 105 in which a secret 106 is stored. In alternative embodiments, the secret 106 may be stored in the main memory of the distributor 103. The secret 106 is a bit string that corresponds to a polynomial over GF(2). In one embodiment, the secret 106 is a cryptographic key to be jointly held in escrow by the recipients 101.

To safeguard the secret 106, the distributor 103 generates a plurality of shares of the secret 106 and distributes one share to each of the recipients 101. The secret 106 can be reconstructed from a subset of the distributed shares. In one embodiment, the cryptosystem 100 also includes a reconstructor 104 to reconstruct the secret 106 using the distributed shares. A person skilled in the art would appreciate that the reconstructor 104 may be a separate computing system as shown in FIG. 1, or, alternatively, reside in the same computing system as the distributor 103 or any of the recipients 101. The distributor 103, the recipients 101 and the reconstructor 104 may be, for example, servers, personal computers (PCs), mobile phones, palm-sized computing devices, personal digital assistants (PDAs), or the like.

In one embodiment, the distributor 103 includes a moduli selector 131, a bit string extension unit 132, and a remainder calculator 133 to generate the shares. The reconstructor 104 includes a share combiner 141 and an extractor 142 to reconstruct the secret 106 from the distributed shares. The functions of these components will be described in greater detail below.

Figure 2:
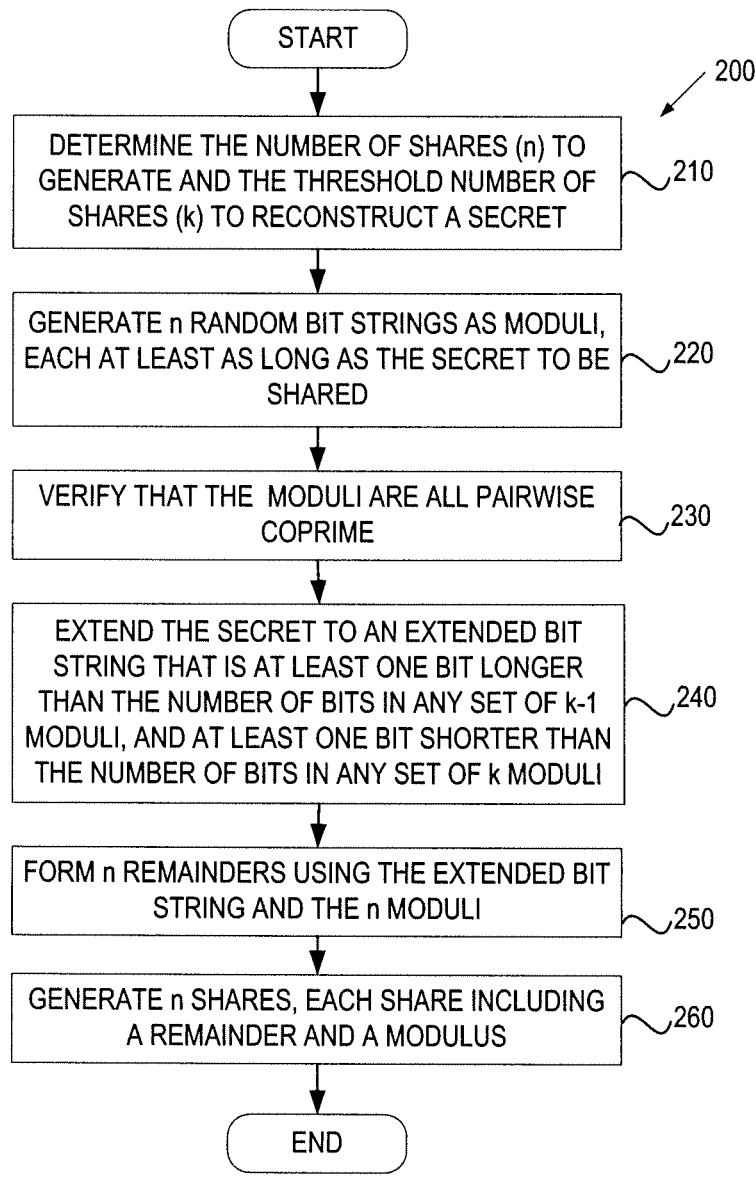
FIG. 2 is a flow diagram of one embodiment of a secret sharing process.

FIG. 2 illustrates a flow diagram of one embodiment of a method 200 for generating a plurality of shares from a secret (e.g., the secret 106). The method 200 may be performed by the processing logic 626 of FIG. 6 that may comprise hardware (e.g., circuitry, dedicated logic, programmable logic, microcode, etc.), software (such as instructions run on a processing device), or a combination thereof. In one embodiment, the method 200 is performed by the distributor 103 of FIG. 1.

Referring to FIG. 2, at block 210, the process 200 begins with the processing logic 626 determining the number of shares (n) to generate and the threshold number of shares (k) for secret reconstruction. At block 220, the moduli selector 131 generates n random bit strings, each at least as long as the secret to be shared. For example, if the secret is expressed as a bit string of s bits in length, then each random bit string has at least s bits. At block 230, the moduli selector 131 verifies that the n random bit strings, representing n polynomials over GF(2), are all pairwise coprime. A group of polynomials ($p_1$, $p_2$, . . . $p_n$) are pairwise coprime if and only if any two polynomials in the group have no common factor other than 1.

If any of the n random bit strings is not pairwise coprime with respect to any of the other random bit strings, the moduli selector 131 replaces that random bit string with a new random bit string until all of the n random bit strings are pairwise coprime. In alternative embodiments, the moduli selector 131 may verify the property of pairwise coprime each time a random bit string of the n random bit strings is generated at block 220. In this alternative embodiment, each time the moduli selector 131 generates a random bit string, that random bit string is compared with all the previously-generated random bit strings to determine whether that random bit string is pairwise coprime with all the previously-generated random bit strings. If that random bit string is not coprime with respect to any of the previously-generated random bit strings, the moduli selector 131 replaces that random bit string with a new random bit string until the new random string is pairwise coprime with all of the previously-generated random bit strings. The moduli selector 131 continues the operations of blocks 220 and 230 until all n random bit strings are pairwise coprime as n polynomials over GF(2). The resulting n random bit strings will be used as moduli in the generation of shares.

Continuing to block 240, the bit string extension unit 132 extends the secret in a bit string that is at least one bit longer than the product of any k−1 moduli, and at least one bit shorter than the product of any k moduli. An embodiment of the bit string extension unit 132 will be described in greater detail with reference to FIG. 3A.

The bit string extension unit 132 extends a secret of s bits in length to an extension bit string of m bits. Provided that each modulus is chosen to be s bits in length, the length m of the extension bit string is between s*(k−1) bits and s*k bits. The bit string extension unit 132 extends the secret such that each modulus can have a "safe" length (e.g., at least as long as the original secret) to increase the difficulty of brute force attacks.

The extension of the secret described herein is critical in a case where the secret being shared is a symmetric encryption key (typically in the range of 128-256 bits). If 64-bit moduli are used to create shares without bit string extension, each share effectively "leaks" 64 bits of information about the secret. Information leakage increases the possibility of success of a brute-force attack. For example, leaking 64 bits of a 128 bit key moves the brute force attack problem from the realm of "won't happen even in fantasy" to the realm of "possible with a supercomputer."

The length of the moduli is related to the number of shares intended for reconstructing the secret. If the length of each modulus is too long (e.g., several times the length of the secret), the secret may be reconstructed with fewer shares than intended (e.g., the threshold number k). If the modulus is too short (e.g., a hundredth of the length of the secret), more shares than k may be needed to reconstruct the secret.

The length of the moduli is directly related to the security of the secret. If short moduli (e.g., 128-bit moduli with a 4096 bit secret) are used, it will reduce the brute force attack solution space from the original length of the secret to however many bits that are lacking from having a complete set of k moduli. In the example of 128-bit moduli, an attacker having k−1 moduli only needs to search a space defined by a 128-bit number. Although a space defined by a 128-bit number is still an absolutely enormous space, it is nowhere nearly as big as a 4096-bit space. Thus, if the length of the secret is not extended such that each modulus is a "safe" size (e.g., at least as long as the original secret), attackers with fewer than k shares could construct a set of guesses for the secret that will allow them to find the secret faster than an exhaustive search.

Continuing to block 250, the remainder calculator 133 calculates n remainders using the moduli and the extended bit string (also referred to, hereinafter, as the extended secret). The calculation is performed using arithmetic defined for polynomials over GF(2). At block 260, the distributor 103 forms n shares of the secret, each share including one of the n remainders and one of the n moduli, which were generated and verified at blocks 220 and 230.

It is understood that the operations of the method 200 can follow a different sequence from what is shown in FIG. 2. For example, the calculation of the extended bit string can be performed before the calculation of the moduli.

As the calculation performed by the above-described secret sharing technique is well-defined in any ring or principal ideal, this technique can be used to share a secret represented as an element of any ring or principal ideal, such as an integer ring or a non-integer ring formed by polynomials over GF(2). Arithmetic defined for polynomials over GF(2) is particularly well suited to calculations performed by computers.

To reconstruct the secret from the n distributed shares, the share combiner 141 of the reconstructor 104 first combines the k or more shares it collects from the recipients 101 to reconstruct the extended bit string. The extractor 142 then extracts the secret from the extended bit string to obtain the secret. An embodiment of the extractor 142 will be described in greater detail with reference to FIG. 3B.

The share combiner 141 applies the extended Euclidean algorithm to reconstruct the extended bit string. According to the Chinese remainder theorem, there exist solutions that are congruent modulo the product of the k or more moduli used to reconstruct the extended bit string. The extended Euclidean algorithm is well-known in the art to be applicable to any ring or principal ideal, including a non-integer ring formed by polynomials over GF(2).

The following example illustrates the secret sharing technique, including share generation and share combination, using moduli drawn from polynomials over GF(2). In this example, it is assumed that the extended bit string has been computed. The computation of the extended bit string and the extraction of the secret from the extended bit string will be described in greater detail with reference to FIGS. 3A, 3B and FIGS. 4-5.

In this example, assume that the extended bit string is 1111 1011 0000, and that the secret sharing technique uses a (k, n) scheme, where k=3 (at least 3 shares to reconstruct the secret) and n=4 (4 total shares). For simplicity of illustration, binary bit strings are used in the example to represent polynomials over GF(2). Thus, the extended secret 1111 1011 0000 represents $x^4+x^5+x^7+x^8+x^9+x^{10}+x^{11}$. It is understood that the bit string is chosen to be short for simplicity of illustration and a bit string for practical use may be hundreds or thousands of bits long.

As mentioned above, the extended bit string should be at least one bit longer than the product of any k−1 moduli and at least one bit shorter than the product of any k moduli. Given the length of the string is 12 and k=3, the length of each modulus is chosen to be 5 bits.

To form the moduli for secret sharing, four random bit strings that are each 5 bits long and pairwise coprime with respect to polynomial division over GF(2) are generated. An example of the four moduli is: 10010, 10011, 11001 and 11111.

Using polynomial division over GF(2), these moduli yield the following four (remainder, modulus) pairs: (1110, 10010), (1000, 10011), (1001, 11001) and (1110, 11111), where each pair represents a share of the secret. Each of the four shares is then distributed to a different one of the recipients 101.

To reconstruct the secret from any k (where, for the current example, k=3) shares (for example, the first three shares), k+1 separate products are constructed. The k+1 products include the product of all k moduli (the overall product) and each distinct product of k−1 moduli (in this example, three products of two moduli each). The distinct product of k−1 moduli is represented as a pair (excluded modulus, product). These products are 1100011000110 (the overall product), (10010, 110111011), (10011, 110100010), and (11001, 100010110).

For each of the last three products, calling the excluded modulus N and the product P, we need to find polynomials R and S such that R*N+S*P=1 (where "1" in this case denotes the constant polynomial and "*" denotes multiplication).

The critical component in each of these cases is S*P. Using the extended Euclidean algorithm, we can obtain for each of these products:

N=10010, S*P=1010 1000 1111,

N=10011, S*P=1011 1001 1000,

N=11001, S*P=1 0001 0110.

These S*P values are constructed such that they are congruent to 1, modulo the associated N value, but congruent to 0, modulo the other N values.

By multiplying each S*P value with the remainder associated with the excluded modulus, three multiplication results are obtained:

1110*1010 1000 1111=110 1011 0101 1010,

1000*1011 1001 1000=101 11001100 0000,

1001*1 0001 0110=1001 1010 0110.

The sum of the three multiplication results is 11 1110 0011 1100. Taking the remainder of the sum modulo 1 1000 1100 0110 (the overall product) produces the bit string 1111 1011 0000, which is the extended bit string.

Figure 3A:
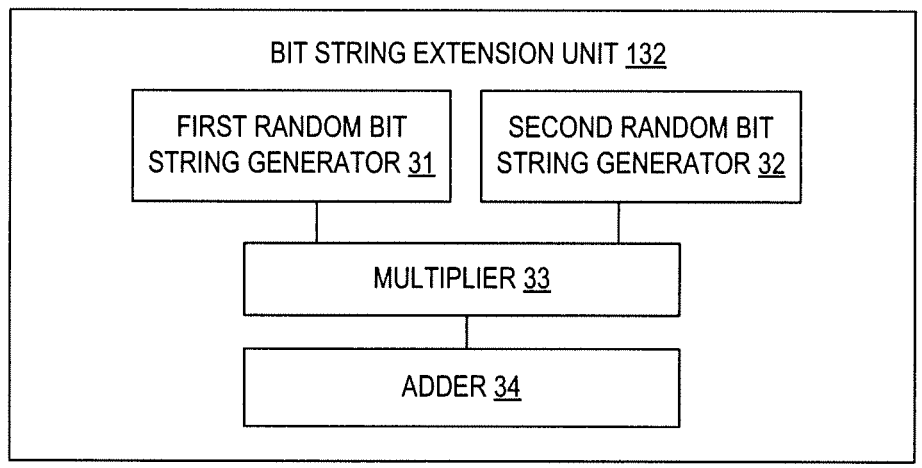
FIG. 3A illustrates a block diagram of one embodiment of a bit string extension unit that extends the length of a secret bit string.

Having described the technique for share generation and reconstruction using an extended bit string, the following descriptions explain, in detail, an embodiment of a technique for extending a secret into an extended bit string. FIG. 3A illustrates an exemplary system of the bit string extension unit 132 (referred to in FIG. 1) in which embodiments of the present invention may operate. In the embodiment of FIG. 3A, the bit string extension unit 132 includes a first random bit string generator 31, a second random bit string generator 32, a multiplier 33 and an adder 34. It is understood that the embodiment of FIG. 3A is for illustration purposes only; variations of the embodiment may include more or fewer of the partial bit string units.

Referring to FIG. 3A, the first random bit string generator 31 generates a random bit string B of length b that is at least one bit longer than the longest possible secret. For example, if a plurality of 256-bit Advanced Encryption Standard (AES) keys are to be shared as secrets, the length of B will be at least 257 bits. The bit string B corresponds to an irreducible polynomial over GF(2). The bit string B is known to the reconstructor 104 during the reconstruction of the secret. The bit string B does not need to be kept secret. In some scenarios, the bit string B can be published to the public.

The second random bit string generator 32 generates a random bit string R of length (m−b), where m is the length of the extended bit string. The length m is chosen such that it is at least one bit longer than the product of any k−1 moduli, and at least one bit shorter than the product of any k moduli. The bit string R is coprime with both the secret bit string S and the random bit string B, where each of R, S and B represents a polynomial over GF(2). As a result, the bit strings R, S and B are pairwise coprime with each other. The bit string R comes from a cryptographically strong source—either a truly random source in an ideal situation, or at least a cryptographically secure source that resists brute force attacks. The bit string R is maintained as a secret without being shared with the recipients 101 or the reconstructor 104.

The multiplier 33 multiplies R with B, using full polynomial multiplications over GF(2). No modulo divisions are involved in the multiplication. The adder 34 adds S to the product (R*B) as polynomials over GF(2). The output of the adder 34 is the extended bit string E.

Figure 3B:
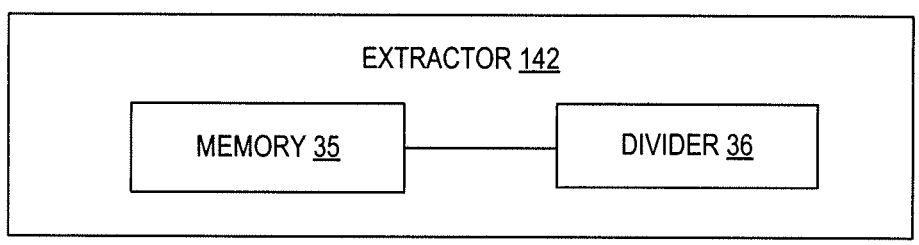
FIG. 3B illustrates a block diagram of one embodiment of an extractor that extracts a secret bit string from an extended bit string.

FIG. 3B illustrates an exemplary system of the extractor 142 (referred to in FIG. 1) in which embodiments of the present invention may operate. In the embodiment of FIG. 3B, the extractor 142 include a memory 35 to store a copy of the extended bit string E and the random bit string B, and a divider 36 to calculate E divided by B (i.e., E/B) as polynomials over GF(2). The remainder of the division is the secret bit string S.

Figure 4:
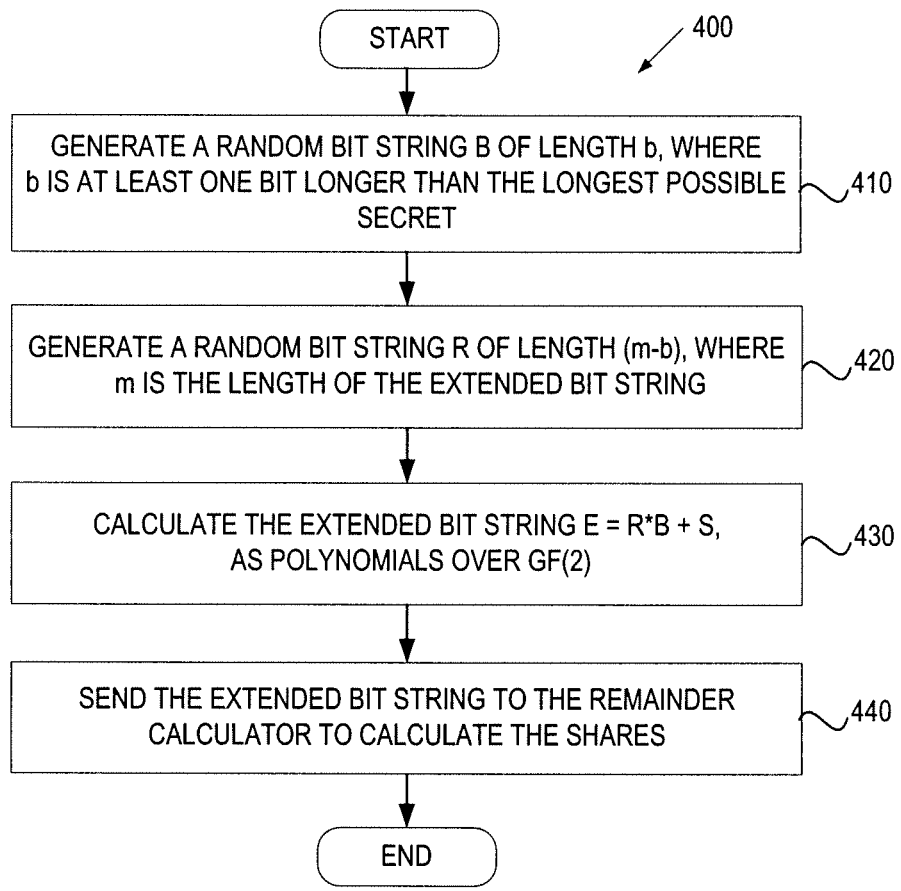
FIG. 4 illustrates a flow diagram of one embodiment of a method that extends the length of a secret bit string to produce an extended bit string.

FIG. 4 illustrates a flow diagram of one embodiment of a method 400 for extending the secret in a bit string. It is noted that the method 400 corresponds to the detailed operations of block 240 of FIG. 2. The method 400 may be performed by the processing logic 626 of FIG. 6 that may comprise hardware (e.g., circuitry, dedicated logic, programmable logic, microcode, etc.), software (such as instructions run on a processing device), or a combination thereof. In one embodiment, the method 400 is performed by the bit string extension unit 132 of FIG. 3A.

Referring to FIG. 4, at block 410, the bit string extension unit 132 generates a first random bit string B of length b that is at least one bit longer than the longest possible secret, and corresponds to an irreducible polynomial over GF(2). At block 420, the bit string extension unit 132 generates a second random bit string R that is coprime with both the secret bit string S and the random bit string B. The bit string R has a length (m−b), where m is the length of the extended bit string that is at least one bit longer than the product of any k−1 moduli, and at least one bit shorter than the product of any k moduli. At block 430, the bit string extension unit 132 multiplies R with B, as polynomials over GF(2), to obtain a product. The bit string extension unit 132 further adds the secret bit string S to the product of R*B to obtain an extended bit string E. As a result, the extended bit string E is calculated as E=R*B+S as polynomials over GF(2). At block 440, the bit string extension unit 132 sends the extended bit string E to the remainder calculator 133 of FIG. 1 to calculate the shares of the secret.

After the extended bit string is computed, the remainder calculator 133 calculates n remainders using the previously-computed n moduli and the extended bit string. The distributor 103 then forms n shares of the secret, each sharing including a pair of (remainder, modulus), and distributes the shares to the n recipients 101. To compute the secret from the n shares, the share combiner 141 of FIG. 1 first combines the k or more shares it collects from the recipients 101 to reconstruct the extended bit string. The extractor 142 then extracts the secret from the extended bit string to obtain the secret.

Figure 5:
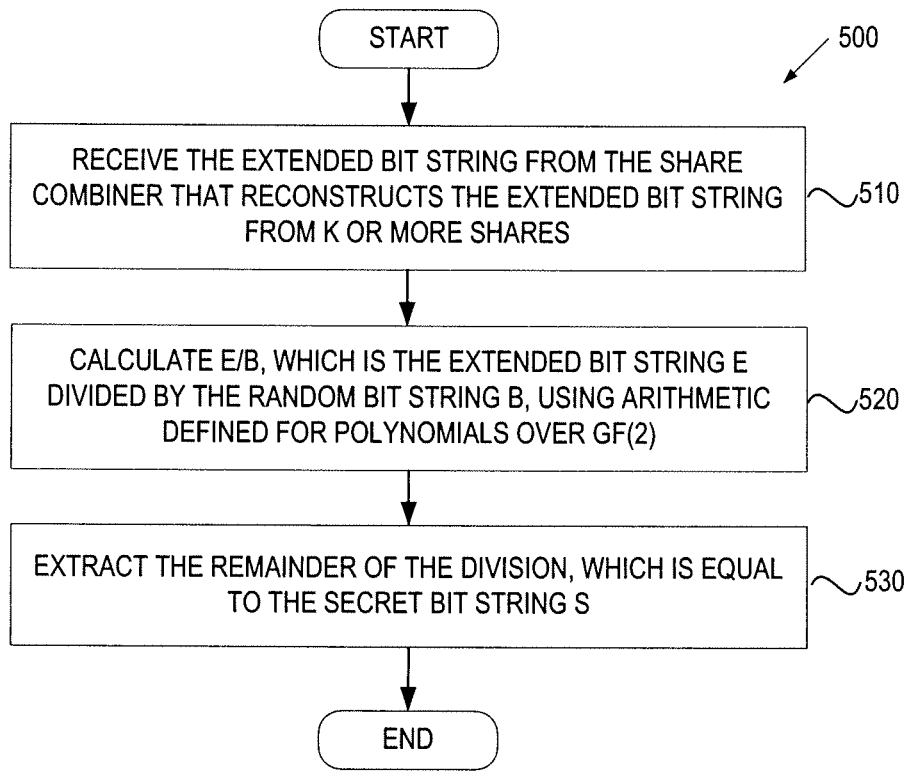
FIG. 5 is a flow diagram of one embodiment of a method that extracts the secret bit string from the extended bit string.

FIG. 5 illustrate a flow diagram of one embodiment of a method 500 for extracting the secret from the extended bit string generated in FIG. 4. The method 500 may be performed by the processing logic 626 of FIG. 6 that may comprise hardware (e.g., circuitry, dedicated logic, programmable logic, microcode, etc.), software (such as instructions run on a processing device), or a combination thereof. In one embodiment, the method 500 is performed by the extractor 142 of FIG. 1.

Referring to FIG. 5, at block 510, the extractor 142 receives the extended bit string E from the share combiner 141 of FIG. 1, which reconstruct the extended bit string E from k or more shares. At block 520, the extractor 142 calculates E/B, which is the extended bit string E divided by the random bit string B, using arithmetics defined for polynomials over GF(2). The extractor 142 may receive and store the bit string B in memory prior to the secret reconstruction, or may receive the bit string B at the time of the secret reconstruction. At block 530, the extractor 142 extracts the remainder of the division, which is equal to the secret bit string S. Using the operations described above, the secret bit string can be easily extracted from the extended bit string E.

Figure 6:
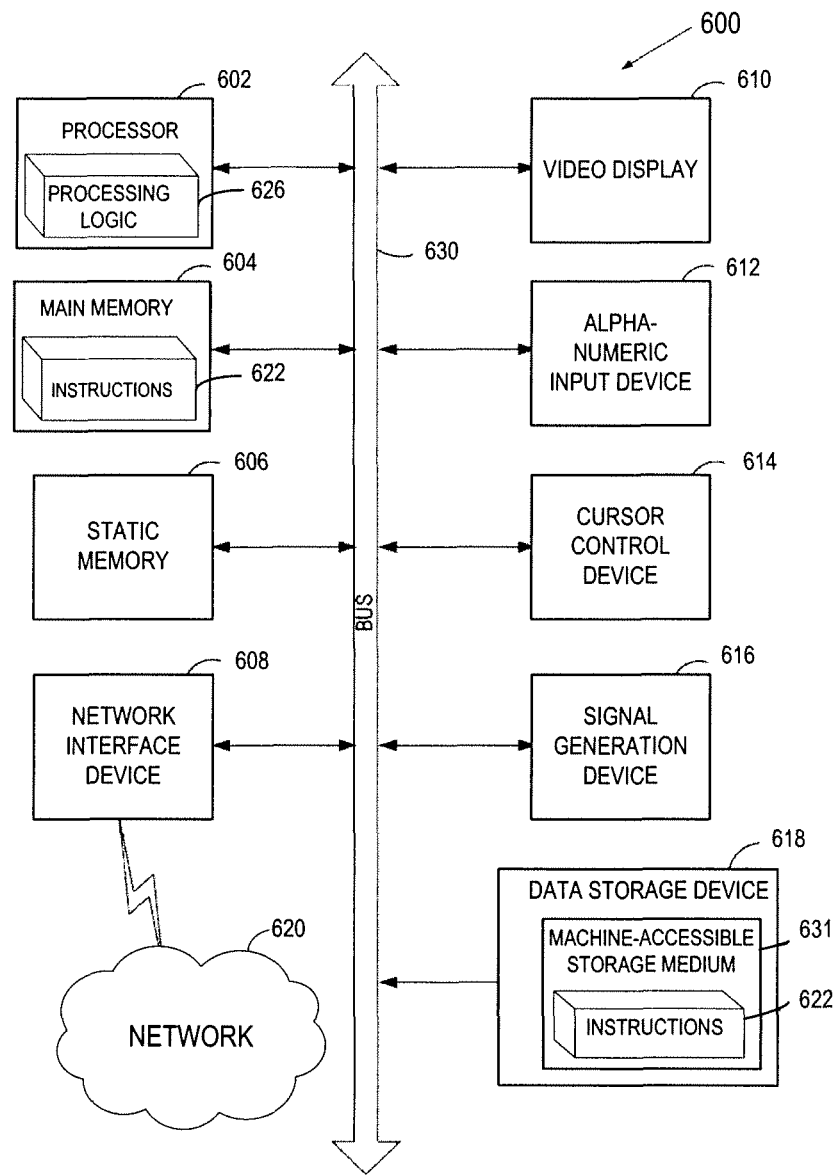
FIG. 6 illustrates a block diagram of an exemplary computer system implementing some embodiments of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

The machine-readable storage medium 631 may also be used to store the secret 106 of FIG. 1. While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and a system for extending a secret bit string have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
creating a plurality of moduli, wherein the plurality of moduli comprises a plurality of random bit strings;
determining, by a computer system, a bit length to use to construct an extended secret bit string, wherein the bit length of the extended secret bit string is at least one bit shorter than a product of a first number of the plurality of moduli and at least one bit longer than a product of a second number of the plurality of moduli, and wherein the first number is a number of shares to reconstruct a secret bit string, and the second number is the first number minus one;
generating, by the computing system, a first bit string comprising a bit length at least one bit longer than a number of bits in the secret bit string, the first bit string corresponding to a first polynomial and the secret bit string corresponding to a second polynomial;
generating a second bit string comprising the bit length of the extended bit string minus the bit length of the first bit string, wherein the second bit string corresponds to a third polynomial;

determining a product of the first bit string and the second bit string as polynomials to form the extended secret bit string, the extended secret bit string corresponding to a fourth polynomial;
adding the secret bit string to the product; and
generating a plurality of shares to distribute from the extended secret bit string.

2. The method of claim 1, wherein each of the plurality of shares comprises a modulus and a remainder.

3. The method of claim 1, wherein the first bit string is a random bit string.

4. The method of claim 1, wherein the first bit string and the second bit string are pairwise coprime in GF(2).

5. The method of claim 1, wherein the first bit string is an irreducible polynomial over GF(2).

6. The method of claim 1, wherein the second bit string is a random bit string generated from a cryptographic source.

7. A system comprising:
a memory;
data storage to store a secret bit string; and
a processing device coupled to the data storage and the memory to:
create a plurality of moduli, wherein the plurality of moduli comprises a plurality of random bit strings;
determine a bit length to use to construct an extended secret bit string, wherein the bit length of the extended secret bit string is at least one bit shorter than a product of a first number of the plurality of moduli and at least one bit longer than a product of a second number of the plurality of moduli, and wherein the first number is a number of shares to reconstruct a secret bit string, and the second number is the first number minus one;
generate a first bit string comprising a bit length at least one bit longer than a number of bits in the secret bit string, the first bit string corresponding to a first polynomial and the secret bit string corresponding to a second polynomial;
generate a second bit string comprising the bit length of the extended bit string minus the bit length of the first bit string, wherein the second bit string corresponds to a third polynomial;
determine a product of the first bit string and the second bit string as polynomials to form the extended secret bit string, the extended secret bit string corresponding to a fourth polynomial;
adding the secret bit string to the product; and
generate a plurality of shares to distribute from the extended bit string.

8. The system of claim 7, wherein each of the plurality of shares comprises a modulus and a remainder.

9. The system of claim 7, wherein the first bit string is a random bit string.

10. The system of claim 7, wherein the first bit string and the second bit string are pairwise coprime in GF(2).

11. The system of claim 7, wherein the first bit string is an irreducible polynomial over GF(2).

12. A non-transitory computer readable storage medium including instructions that, when executed by a processing device, cause the processing device to perform operations comprising:
creating a plurality of moduli, wherein the plurality of moduli comprises a plurality of random bit strings;
determining, by the processing device, a bit length to use to construct an extended secret bit string, wherein the bit length of the extended secret bit string is at least one bit shorter than a product of a first number of the plurality of moduli and at least one bit longer than a product of a second number of the plurality of moduli, and wherein the first number is a number of shares to reconstruct a secret bit string, and the second number is the first number minus one;
generating, by the processing device, a first bit string comprising a bit length at least one bit longer than a number of bits in the secret bit string, the first bit string corresponding to a first polynomial and the secret bit string corresponding to a second polynomial;
generating a second bit string comprising the bit length of the extended bit string minus the bit length of the first bit string, wherein the second bit string corresponds to a third polynomial;
determining a product of the first bit string and the second bit string as polynomials to form the extended secret bit string, the extended secret bit string corresponding to a fourth polynomial;
adding the secret bit string to the product; and
generating a plurality of shares to distribute from the extended secret bit string.

13. The non-transitory computer readable medium of claim 12, wherein each of the plurality of shares comprises a modulus and a remainder.

14. The non-transitory computer readable medium of claim 12, wherein the first bit string is a random bit string.

15. The non-transitory computer readable medium of claim 12, wherein the first bit string and the second bit string are pairwise coprime in GF(2).

16. The non-transitory computer readable medium of claim 12, wherein the first bit string is an irreducible polynomial over GF(2).

17. A method comprising:
receiving a first bit string comprising a bit length at least one bit longer than a number of bits in a secret bit string;
receiving, by a processing device, an extended secret bit string calculated from the first bit string, the secret bit string, and a second bit string, wherein a bit length of the extended secret bit string is at least one bit shorter than a product of a first number of a plurality of moduli and at least one bit longer than a product of a second number of the plurality of moduli, and wherein the first number is a number of shares to reconstruct the secret bit string and the second number is the first number minus one;
dividing, by the processing device, the extended secret bit string by the first bit string; and
determining, by the processing device, a remainder from dividing the extended secret bit string by the first bit string, wherein the reminder is identified as the secret bit string.

18. The method of claim 17, wherein the extended bit string is generated from a plurality of shares, each share comprising a modulus and a remainder.

19. The method of claim 17, wherein the first bit string corresponds to an irreducible polynomial over GF(2).

20. A non-transitory computer readable storage medium including instructions that, when executed by a processing device, cause the processing device to perform operations comprising:
receiving a first bit string comprising a bit length at least one big longer than a number of bits in a secret bit string;
receiving, by the processing device, an extended secret bit string calculated from the first bit string, the secret bit string, and a second bit string, wherein a bit length of the extended secret bit string is at least one bit shorter than a product of a first number of a plurality of moduli and at least one bit longer than a product of a second number of the plurality of moduli, and wherein the first number is a number of shares to reconstruct the secret bit string and the second number is the first number minus one;

dividing, by the processing device, the extended bit string by the first bit string; and determining, by the processing device, a remainder from dividing the extended secret bit string by the first bit string, wherein the reminder is identified as the secret bit string.

21. The non-transitory computer readable medium of claim 20, wherein the extended bit string is generated from a plurality of shares, each share comprises a modulus and a remainder.

22. The non-transitory computer readable medium of claim 20, wherein the first bit string corresponds to an irreducible polynomial over GF(2).

* * * * *

UNITED STATES PATENT AND TRADEMARK OFFICE
CERTIFICATE OF CORRECTION

PATENT NO. : 8,615,084 B2  
APPLICATION NO. : 12/129426  
DATED : December 24, 2013  
INVENTOR(S) : James P. Schneider Page 1 of 1

It is certified that error appears in the above-identified patent and that said Letters Patent is hereby corrected as shown below:

In the claims

In claim 17, column 12, line 49, delete "reminder" and insert --remainder--;

In claim 20, column 12, line 61, delete "big" and insert --bit--;

In claim 20, column 13, line 8, delete "reminder" and insert --remainder--.

Signed and Sealed this  
Third Day of November, 2015

Michelle K. Lee  
*Director of the United States Patent and Trademark Office*